(12) United States Patent
Belkin et al.

(10) Patent No.: US 6,871,579 B2
(45) Date of Patent: Mar. 29, 2005

(54) DEVICE FOR PRODUCING BEER AND A UNIT FOR AFTER-FERMENTATION

(75) Inventors: Evgeny Konstantinovich Belkin, Marshala Meretskogo STR., 2-27, Moscow (RU), 12398; Andrei Arkadievich Peshkin, Surikova STR., 4-4, Moscow (RU), 125080; Vladimir Gennadievich Matveev, PR. Vernadskogo 89-90, Moscow (RU), 117526; Leonid Mikhailovich Prikhozhan, PR. Vernadskogo 105-2-234, Moscow (RU), 117526; Yury Vasilievich Artamonov, D. Bednogo STR., 11, P/O Suponevo, Bryansk (RU), 242020

(73) Assignees: Evgeny Konstantinovich Belkin, Moscow (RU); Andrei Arkadievich Peshkin, Moscow (RU); Vladimir Gennadievich Matveev, Moscow (RU); Leonid Mikhailovich Prikhozhan, Moscow (RU); Yury Vasilievich Artamonov, Bryansk (RU); Pavel Alexandrovich Yakovlev, Moscow (RU)

( * ) Notice: Subject to any disclaimer, the term of this patent is extended or adjusted under 35 U.S.C. 154(b) by 0 days.

(21) Appl. No.: 10/399,889
(22) PCT Filed: Oct. 23, 2001
(86) PCT No.: PCT/RU01/00437
    § 371 (c)(1),
    (2), (4) Date: Apr. 22, 2003
(87) PCT Pub. No.: WO02/38723
    PCT Pub. Date: May 16, 2002

(65) Prior Publication Data
    US 2004/0031392 A1 Feb. 19, 2004

(30) Foreign Application Priority Data

Nov. 9, 2000 (RU) .................................... 2000127857
Mar. 7, 2001 (RU) .................................... 2001106027

(51) Int. Cl.$^7$ .......................... C12C 7/00; C12C 13/00
(52) U.S. Cl. .............................. 99/276; 99/277; 99/278
(58) Field of Search ................... 99/276, 277, 277.1, 99/277.2, 278

(56) References Cited

U.S. PATENT DOCUMENTS

| | | | | |
|---|---|---|---|---|
| 3,627,544 A | * | 12/1971 | Bosewitz et al. | 99/276 |
| 5,970,846 A | | 10/1999 | Roehr | 99/276 |

FOREIGN PATENT DOCUMENTS

| | | |
|---|---|---|
| EP | 0087139 | 8/1983 |
| EP | 0208640 | 1/1987 |
| GB | 2077759 | 12/1981 |
| RU | 2072392 | 1/1997 |
| SU | 1817791 | 5/1993 |

OTHER PUBLICATIONS

Patent abstract of Great Britain Appln. No.: 2077759 Filed: Dec. 23, 1981.
Patent abstract of EP0087139 Filed: Aug. 31, 1983.
Glavachek F., et al., Pischevaya promyshlennost, 1997, pp 588–593.

* cited by examiner

*Primary Examiner*—Reginald L. Alexander
(74) *Attorney, Agent, or Firm*—Ladas & Parry

(57) ABSTRACT

The invention relates to the food industry. In order to reduce sales expenses and preserve the taste of beer, the inventive device is provided by i-number communication units, necessary for operational connection and disconnection of i-number units for after-fermentation, and each of i-number units for after-fermentation is embodied in such a way so that it is transportable, thermally insulated, hermetic, protected from deposited yeast mixing with non-filtrated beer while transportation and can be connected to a cooling system, arranged at a point of sale and/or dispense.

13 Claims, 2 Drawing Sheets

US 6,871,579 B2

DEVICE FOR PRODUCING BEER AND A UNIT FOR AFTER-FERMENTATION

FIELD OF THE INVENTION

The invention relates to the food industry, especially to low power brewing devices and it can be used in production and delivery of non-filtrated beer to dispense and/or realization places, furthermore, a unit for after-fermentation makes it possible to transport beer being in the stage of after-fermentation to another place of after-fermentation with the possibility of its dispensing and/or realizing.

BACKGROUND OF THE INVENTION

A device for producing beer is known, containing a system of communicated pipe-lines, a mash wort brewing unit and a low pressure steam-generator connected thereto, a filtrating chan, a hydrocyclone unit, cylindrical reservoirs arranged vertically for fermentation and after-fermentation with cooling jackets, a unit for cooling wort, a tank for hot water, a container for gathering brewers' yeast (See patent document RU No2039801 cl. C12C 11/00 05.07.93).

However, the known device is not designated for operational delivery to the consumer of beer without loss of taste properties and its realization will cost much.

The closest prior art for the claimed device is a device for producing beer comprising interconnected by a communicating system a device for beer wort brewing, a cooler, N units for fermentation, where N is an integer, K units for after-fermentation, where K is an integer and a cooling system (see patent SU 1817791 cl. C12C 13/00, 12.03.92).

However, the known device requires great expenses to deliver and store finished non-filtrated beer to the consumer, and to organize its sale, and it does not guarantee preservation of the natural taste properties, as the time of storage of non-filtrated beer without strict temperature regime is limited to 3–4 days.

A unit for after-fermentation is known, used in the said known device, comprising an isothermal vessel in insulated enclosure, having a cooling jacket and functional valves (See Patent document SU 1817791, cl.C12C 13/00, 12.03.92).

However, the structure of the known device is of stationary type, which makes it impossible to use for operational delivery of non-filtrated beer at a point of dispense and sale.

The basis of the invention is the problem of creation of a device that can reduce expenses for beer realization to the consumer, preserving its taste properties with the help of exclusion of intermediate operations of non-filtrated beer delivery, transfer procedures and providing optimal regime for its storage.

Another problem is to create the structure of a unit for after-fermentation, which makes possible qualitative non-filtrated beer dispensing from it not only in the place of production, but also in any beer-dispensing section within a region or a city.

The problem is solved in that a device for producing beer, comprising a device for beer wort brewing, a cooler, N units for fermentation, where N is an integer, K units for after-fermentation, where K is an integer, and a cooling system, interconnected by a communicating system, according to the invention, further comprises i-number of communication units, necessary for operational connection and disconnection of i-number of said K units for after-fermentation, where i—is an integer, equal to or less than K, and each of i-number of units for after-fermentation is embodied in such a way so that it is transportable, thermally insulated, hermetic, protected from deposited yeast mixing with non-filtrated beer during transportation, and can be connected to a cooling system, arranged at a point of dispense and/or sale, and the inner volume of each of i-number units for after-fermentation does not exceed 0,8 of inner volume of a unit for fermentation.

According to another subject of the invention, a unit for after-fermentation comprises an isothermal vessel with a cooling jacket and is made with the possibility for operational connection, disconnection and transportation with finished beer at a point of sale and/or dispense, or beer at the stage of after-fermentation to another place of after-fermentation with the possibility for its dispense and/or realization. The bottom of an isothermal vessel comprises deposit space, which can have a conical shape with an angle between generatrixes in an axial plane of its cross section, constituting $\leq 90°$ or it can have the form of a cylinder, and the volume of deposit space may be equal to $0,01 \div 0,1$ of the isothermal vessel's volume, and the isothermal vessel can be arranged on a common base on supports in an insulation shell with a housing. Furthermore, it can be provided by a fitting box with measuring devices, functional valves and joints for operational connection and disconnection, communicated by corresponding pipe-lines to the inner space of the isothermal vessel and to its cooling jacket.

The essence of the invention is in the fact that the implementation in the above mentioned manner of units for after-fermentation and the introduction of necessary quantity of additional communication units makes possible the realization of operational connection and disconnection of units for after-fermentation, and transportation of non-filtrated beer with the possibility to connect them to cooling system at the place of sale and/or dispense, to provide preservation of taste properties for a long time. No intermediate operations on delivery and dispense procedure are made, which leads to reduction of expenses for beer-realization to the consumer.

BEST METHOD OF CARRYING OUT THE INVENTION

Figure 1:
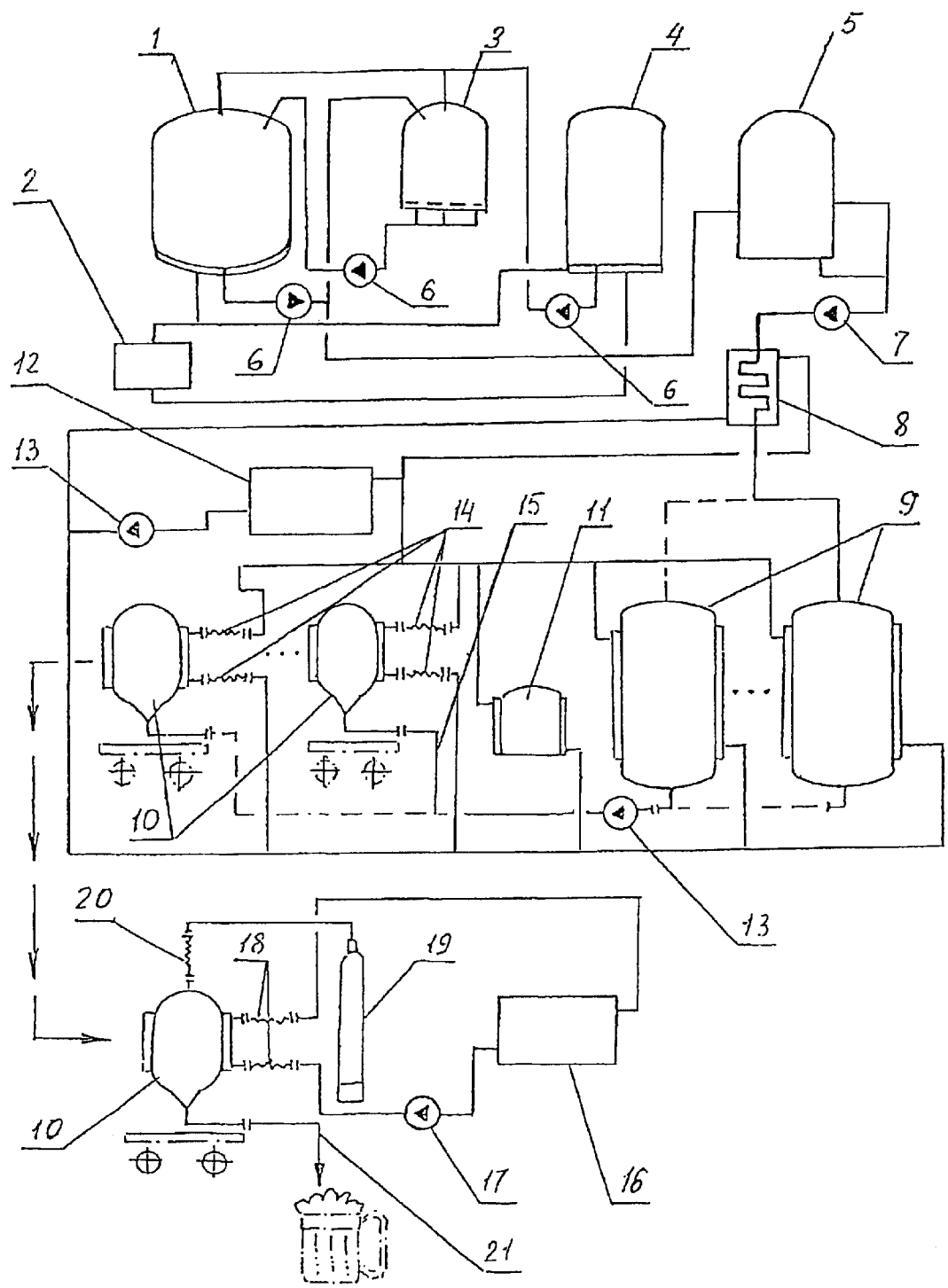
FIG. 1 shows the structure of the claimed device for producing beer.

The device shown in FIG. 1 comprises a device for beer wort brewing, including mash wort brewing unit 1, steam generator 2, filtration unit 3, water-heater 4, wort-clarification unit 5, interconnected by a communication system, and linked by a system of pipe-lines with pumps 6. This device has an output through a pump 7 towards the complex of bearing equipment, made of heat-exchanger 8, N units 9 for fermentation, K units 10 for after-fermentation, where K and N are integers, yeast cooler 11, cooling system 12, interconnected by a communication system with pumps 13, with i-communication units 14 connecting-disconnecting units 10 for after-fermentation with cooling system 12, and with a pipe-line 15 for delivery from units 9 for fermentation into units 10 for after-fermentation. The place for dispensing beer into the consumer's container should be provided with cooling system 16 with pump 17 and with units 18 for connecting-disconnecting, supercharging tank 19 of the units 10 for after-fermentation by acid gas with a unit 20 for connecting and disconnecting, and communications 21 for dispensing beer to the consumer's container.

The device can comprise i-number units 10 for after-fermentation, made in a way so that it is transportable, where i—is an integer, equal to or less than K. In the latter case the device can comprise units 10 for after-fermentation both of stationary type and of transportation type.

Figure 2:
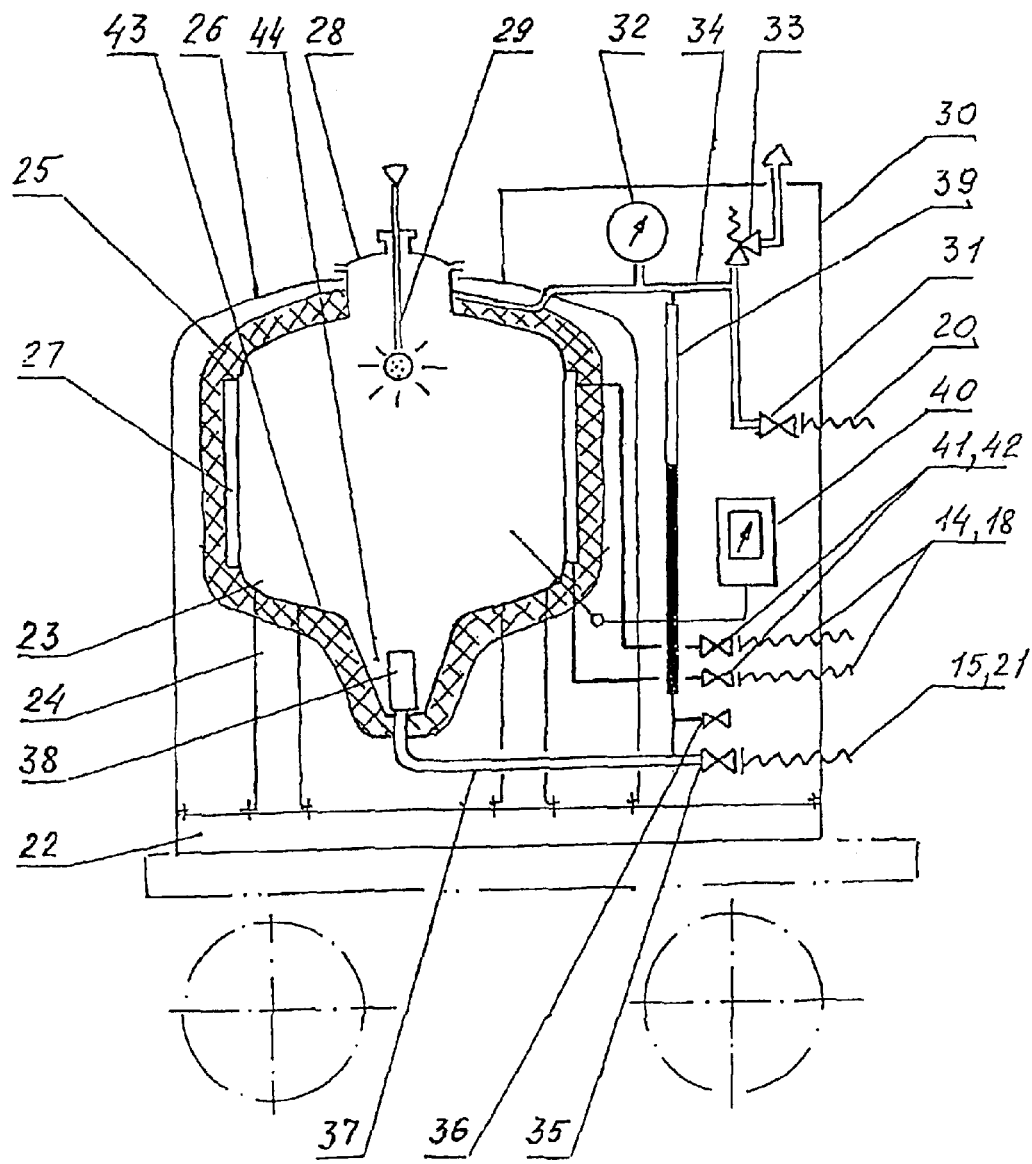
FIG. 2 shows the structure of a unit for after-fermentation, made in a way so that it is transportable.

The structure of each of the i-number units 10 for after-fermentation (FIG. 2) comprises arranged on the common base 22 vessel 23 on supports 24 in thermal insulation shell 25 with housing 26, having cooling jacket 27. The upper part of the unit 10 for after-fermentation may have a manhole 28, in the cover of which there is an opening with plug for installing a cleaning head 29. On the common base 22 there is also fitting box 30, where valve 31 for supercharging by acid gas and gas disposal is arranged, pressure gauge 32, safety valve 33 (sheet-unit), connected to gas spaces of the upper part of vessel 23 by pipe-line 34, valve 35 for filling-dumping and valve 36 for choosing samples, connected to lower part of the vessel 23 by pipe-line 37 of drain-bulk, on which a sleeve 38 for exclusion of ingress of deposited yeast into pipeline 37 is arranged in the vessel 23, level-indicator 39 linked with pipe-lines 34 and 37, respectively, with the upper and lower parts of vessel 23, in the middle part of which thermometer 40 and valves 41 and 42 for feeding water for cooling into jacket 27 are arranged.

The inner volume of each of the i-number units 10 for after-fermentation does not exceed 0,8 of the inner volume of unit 9 for fermentation.

Bottom 43 of isothermal vessel 23 can comprise deposit space 44.

Deposit space 44 can have a conical shape with an angle between generatrixes in an axial plane of its cross section, constituting $\leq 90°$ or a form of a cylinder. The optimal volume of deposit space 44 is equal to $0,01 \div 0,1$ of volume of isothermal vessel 23. It is necessary for exclusion of shake-up of deposited yeast in transporting the unit 10 for after-fermentation.

Any standard system of connection pipe, nipple or collet connection together with hard or flexible pipe-line can be used as any of i-communication units 14 for connection and disconnection.

The Device Operates in the Following Manner

Beer wort is made in brewing device, water is added to mash-wort brewing unit 1 from water-heating unit 4, malt is poured and mash is prepared there, heating the water and the wort in the units by steam from steam-generator 2. Then the mash from unit 1 is pumped to filtration unit 3 and the first wort is filtered from mash. The first wort is delivered to the mash-wort brewing unit 1 by a pump 6 and the remaining grains are cleaned by hot water from water-heating unit 4, the said hot water is sent to filtration unit 3, and the flush water is transferred into mash-wort brewing unit 1, diluting the first wort. After filling unit 1, the wort is warmed by steam from steam-generator 2 until it boils, hop is brought in and is boiled till readiness. Later the hot wort is sent by pump 6 to wort-clarification unit 5, where it is cleaned from albumin and hop sediment.

Clarified hot wort is sent from unit 5 by pump 7 through wort-cooler 8, where it is cooled by water from cooling system 12, to one of N free units 9 for fermentation, into which yeast, which had been stored in yeast cooler 11, is placed, later, wort is fermented during several days, turning into young (green) beer. Cooling system 16 provides temperature regimes of the main fermentation.

When brewed, in any of N units 9 for fermentation, young beer is pumped by transfer pump 13 through pipeline 15 is overflown into units 10 for after-fermentation without any sediment, which are linked to cooling system 12 by connecting communication units 14 for connecting disconnecting, and each of i-units 10 for after-fermentation is fully filled, as its volume is $\leq 0,8$ the volume of every N units 9 for fermentation. The quantity of filled i-units 10 for after-fermentation provides the reception of young beer by total volume from units 9 for fermentation without sediment, in case where i=K, or the sediment may flow into stationary tanks of after-fermentation, in case where i<K. After transfer from units 9 for fermentation, deposited yeast is taken out and is kept and cleaned in yeast cooler 11 till next use.

All product spaces must be disinfected and carefully cleaned with the help of washing head 29 or manually through manhole 28 with analysis for clarity through valve 36, in any transportation unit 10 for after-fermentation.

Young beer goes to the transportation unit 10 for after-fermentation through valve 35 on drain-bulk pipeline 37, on which removable bush 38 is put beforehand inside vessel 23 for exclusion of deposited yeast ingress in drain-bulk pipeline 37. In case of filling the vessel 23, the air is discharged through gas disposal valve 31, and the filling control is realized according to level-indicator 39.

Later a unit 10 for after-fermentation is hermetically closed (rabbeted), valves 41, 42 are opened, and beer-cooling takes place with the help of jacket 27, cooling beer to $0 \ldots +2°$ C. in vessel 23. The process is controlled with the help of thermometer 40. Under this temperature beer is ripening within several weeks till readiness, being saturated by dissolved acid gas. Pressure is controlled by pressure gauge 32 and is preserved from high pressure by valve 33, simultaneously, overpressure may be discharged through supercharging gas-disposal valve 31.

The selection of samples for beer analysis is realized through valve 36, and connecting units 14 of cooling system 12 disconnect finished beer and unit 10 for after-fermentation is transported to the places of dispensing within a city or a region. With the help of thermal insulation shell 25 with housing 26 of isothermal vessel 23 of a unit 10 for after-fermentation, change of beer temperature during 4-hour transportation does not exceed 1° C. The fixing on the common base 22 with box 30 provides the strength of the structure, safety in transportation and stability in the place of operation.

For the exclusion of deposited yeast shake-up, bottom 43 of vessel 23 has deposit space 44 of conical shape with an angle between generatrixes in an axial plane of its cross section, constituting $\leq 90°$, which guarantees calm condition for deposited yeast in transporting unit 10 for after-fermentation, as the volume of space 44 is $\geq 1\%$ of volume of vessel 23 of unit 10 for after-fermentation, and it completely guarantees the placement of deposited yeast, which, sinking on the bottom 43 of vessel 23, drains off into space 44.

At the place of dispensing finished beer, the transportation unit 10 for after-fermentation is connected to cooling system 16 by communications 18. Tank 19 with acid gas is connected to valve 31 of supercharging and gas-disposal by connecting unit 20, communications 21 for dispensing beer are joined to valve 35 to the consumer's container, and they are stationarily arranged at the place of delivery of dispensing. After connection of unit 10 for after-fermentation, valves 41, 42 are opened for water delivery into jacket 27 for cooling.

The unit 10 for after-fermentation is ready for lengthy storage of non-filtrated beer. During beer-realization the level of beer in vessel 23 is controlled by a level indicator 39, the pressure is controlled by pressure gauge 32, which is supported by acid gas supercharging from tank 19.

If the use of non-filtrated beer takes place slowly or stops at the place of realization, beer can be preserved under cooling in the units 10 for after-fermentation for a rather long time, without losing its initial taste properties. The necessity of having a cooling system at the place of delivery for dispensing to the consumer's container is characterized by low expenses in comparison with expenses for beer realization in bottles, kegs and tanks, which need supplementary beer dispensing, preliminary filtration, pasteurization for longer period of storage.

In fact, a unit 10 for after-fermentation can be transported at any stage of beer ripening, if after transportation the corresponding conditions for after-fermentation are guaranteed, including presence of cooling system 16 and other units, necessary for conditions of after-fermentation, selection of samples and storage of ready non-filtrated beer.

So the delivery of finished non-filtrated beer to realization points with the help of the claimed inventions, together with other above mentioned operations, gives opportunity to widen the consumption of beneficial low-alcoholic beverage without large expenses, and to find the way to organize free time of youth, which is one of the main problems nowadays.

Industrial Applicability

The said advantages of the claimed inventions provide the possibility of broad usage in the food industry.

What is claimed is:

1. A unit for after-fermentation of a beverage comprising:
   (a) an isothermal vessel comprising a cooling jacket and thermal shell insulating means for insulating the vessel; said isothermal vessel further comprising deposit space means, comprising a deposit space at a bottom of the isothermal vessel, for preventing yeast deposited in the vessel and settled in the deposit space from mixing with beverage in a portion of the vessel outside of the deposit space during transport of the vessel;
   (b) beverage dispensing means for dispensing beverage from the isothermal vessel;
   (c) valve means for operational connection of the cooling jacket to, and disconnection of the cooling jacket from, a cooling system; and
   (d) base means for supporting the isothermal vessel, the beverage dispensing means and the valve means on a common base such that they are transportable as a unit on the base means.

2. The unit according to claim 1, wherein the valve means comprises a plurality of valves and pipes supported on the base.

3. The unit according to claim 1, wherein the deposit space has a conical shape and wherein generatrixes in an axial plane of a cross section of the deposit space define between them an angle of 90° or less.

4. The unit according to claim 1, wherein the deposit space has a cylindrical form.

5. The unit according to claim 1, wherein a volume of the deposit space is equal to 0.01 to 0.1 of a volume of the isothermal vessel.

6. The unit according to claim 1, further comprising a fitting box, said fitting box comprising means for measuring a parameter of the beverage inside the vessel and means for connecting the vessel to a source of acid gas and to a gas disposal, said fitting box being supported on the base.

7. The unit according to claim 6, wherein the fitting box also comprises means for procuring a sample of the beverage from the insulating vessel.

8. A method for transporting a beverage comprising:
   (a) providing the unit of claim 1 with the valve means connecting the cooling jacket to a first cooling system at a first location;
   (b) inserting the beverage into the isothermal vessel;
   (c) disconnecting the valve means from the first cooling system and transporting the unit to a second location; and
   (d) connecting, by means of the valve means, the cooling jacket to second cooling system at the second location.

9. The method according to claim 8, further comprising dispensing the beverage from the vessel at the second location.

10. In an apparatus for producing beer comprising the following components: (a) means for brewing beer wort; (b) means for fermentation of the beer wort, said means for fermentation comprising N fermentation units, where N is a whole number; (c) K units for after-fermentation, where K is a whole number; (d) a cooling system and (e) means for interconnecting components (a),(b),(c) and (d), the improvement comprising:
   (f) means for connection and disconnection of the after-fermentation units from components (a), (b), and (d), said means for connection and disconnection comprising a number i of communication units, where i is a whole number that is equal to or less than K, wherein each of said communication units and a corresponding one of the after-fermentation units is supported on a common base such that each of the communication units and its corresponding after-fermentation unit is transportable from one location to another as a unit.

11. The apparatus according to claim 10, wherein each of the after-fermentation units comprises an isothermal vessel comprising a cooling jacket, thermal shell insulating means for insulating the vessel, and deposit space means, comprising a deposit space at a bottom of the isothermal vessel, for preventing yeast deposited in the vessel and settled in the deposit space from mixing with beer in a portion of the vessel outside of the deposit space during transport of the after-fermentation unit.

12. The apparatus according to claim 11, wherein each of the after-fermentation units comprises beverage dispensing means for dispensing beverage from the isothermal vessel.

13. The apparatus according to claim 10, wherein each of the after-fermentation units has a volume that is not more than 0.8 of an inner volume of one of the fermentation units.

* * * * *